United States Patent [19]

Ruiz

[11] Patent Number: 4,875,731

[45] Date of Patent: Oct. 24, 1989

[54] COMBINATION PICK-UP TRUCK BED LINER AND CAMPER TOP

[76] Inventor: Samantha L. Ruiz, 684 Robinson Dr., Prescott, Ariz. 86301

[21] Appl. No.: 211,855

[22] Filed: Jun. 27, 1988

[51] Int. Cl.⁴ .............................................. B62D 33/02
[52] U.S. Cl. ..................................... 296/37.2; 296/10; 296/26; 296/157
[58] Field of Search ....................... 296/37.2, 37.1, 10, 296/26, 156

[56] References Cited

U.S. PATENT DOCUMENTS 3,181,909  5/1965  Wise ...................................... 296/10
4,181,349  1/1980  Nix et al. ............................. 296/39.2

Primary Examiner—Robert R. Song
Attorney, Agent, or Firm—Stanley M. Miller

[57] ABSTRACT

A combination pick-up truck bed liner and camper top. A bed liner conforms to the contour of a pick-up truck's bed and protects the bed from deterioration due to rust, abrasion and other damage of the type often inflicted upon unprotected truck beds. The bed liner is releasably secured to the bed and is made of light in weight materials so that it can be inverted and used as a camper top.

7 Claims, 8 Drawing Sheets

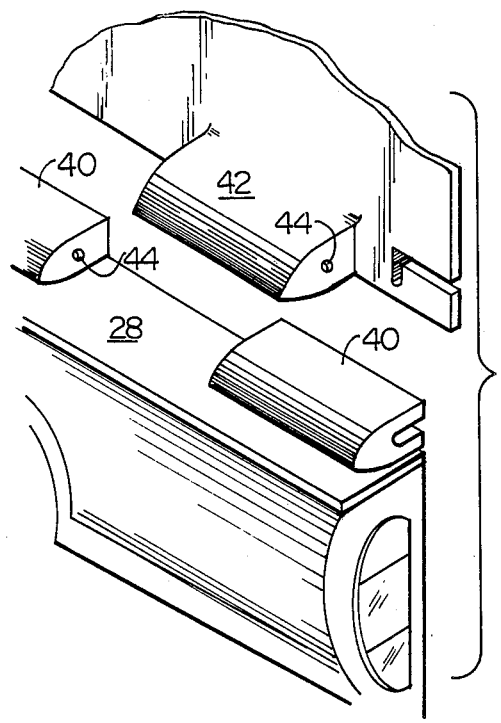
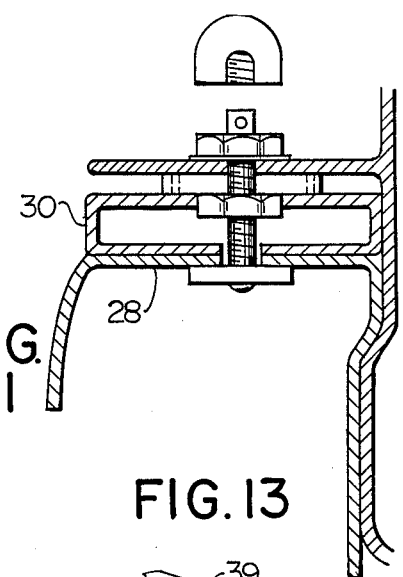
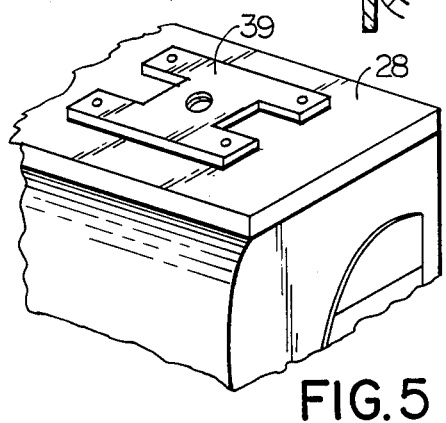
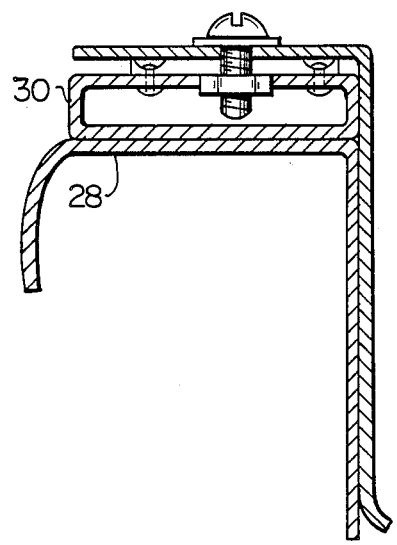
FIG. 11
FIG. 13
FIG. 5
FIG. 9

COMBINATION PICK-UP TRUCK BED LINER AND CAMPER TOP

BACKGROUND OF THE INVENTION

1. Field of the Invention

This invention relates, generally, to combination articles of manufacture, and more particularly relates to a bed liner for a pick-up truck that provides a camper top for a pick-up truck when inverted.

2. Description of the Prior Art

Pick up trucks are often used for chores that damage the bed of the truck. Heavy items can dent the truck bed, rendering it unsightly or affecting its utility, for example.

Accordingly, inventors have developed protective means for pick-up truck beds: the protective means are commonly known as bed liners because they cover the bed and protect it from the ravages of use.

Typically, a truck owner will purchase a bed liner and mount it to the truck in a permanent fashion; the bed liner must be tightly secured to the truck bed if it is to perform its intended function, so it makes sense to permanently attach the liner to the truck bed.

Owners of pick-up trucks have also noted that the bed of a pick-up truck makes a convenient sleeping area for occassional use. Inventors have therefore developed articles of manufacture known as 'camper tops' which are used to enclose the bed area of the truck so that the bed area can be used for sleeping quarters on camping trips or other recreational journeys.

Both truck bed liners and camper tops are very popular among pick-up truck owners, for obvious reasons. However, if a pick-up truck owner wants to protect the bed of the truck on a daily basis and have a camper top available for occassional use, it becomes necessary to install a commercially available bed liner on the truck, and to store a camper top in a storage location such as a garage until the camper top is needed.

Thus, many pick-up truck owners own bed liners such as those shown in U.S. Pat. Nos. 3,811,768 to Nix (1975), 4,111,481, 4,161,335, 4,181,349 and 4,336,963 to Nix and others, awarded in 1978, 1979, 1980, and 1982, respectively, 4,279,439 to Cantieri (1981), 4,333,678 to Munoz and others (1982), and 4,341,412 to Wayne (1982). Since those bed liners serve only their intended function and no other function, many pick-up truck owners also own camper tops of the type shown in U.S. Pat. No. 4,648,649 to Beal (1987).

The Beal camper top, and other known camper tops as well, cannot function as a bed liner. Just as importantly, none of the bed liners that were known prior to the present disclosure can function as camper tops.

Clearly, the disparate arts of bed liners and camper tops have been understood by earlier inventors as being separate fields of endeavor; no teaching or suggestion appears in any known prior art literature that a single article of manufacture could perform both functions.

If an article of manufacture could be discovered that would obviate the need for pick-up truck owners to own both bed liners and camper tops, the art of both fields would be advanced and the art of combination bed liners and camper tops would be pioneered.

However, the prior art neither teaches nor suggests how such a pioneering breakthrough could be achieved.

SUMMARY OF THE INVENTION

The longstanding but heretofore unfulfilled need for an article of manufacture that performs the duties of a bed liner on a daily basis and which may be converted into a camper top on occassion is now fulfilled in an ingenious combination structure.

Three embodiments of the invention will be shown and described, but the invention can be carried out in many modes in view of the disclosure of the basic teaching herein; thus, the scope of the invention is broad and is not limited to the specific structures set forth in the drawings.

All three of the exemplary embodiments provide bed liners that are releasably secured to the bed of the truck and which, when released, are inverted to provide a camper top.

The bed liners conform to the contour of the truck bed; large wheel well areas, for example, are provided to receive the truck's wheel wells. When the liner is inverted and used as a camper top, the wheel well areas provide an attractive recessed area that appear to the casual observer as design ornamentation that enhances the aesthetic appeal of the vehicle.

In all embodiments, the tailgate portion of the bed liner becomes an attractive closure means for the camper top which cooperates with the original equipment tailgate to form a closure means for the enclosed area.

It is the primary object of this invention to provide a combination bed liner and camper top.

Another object is to provide a bed liner that is attractive in appearance when converted into a camper top.

Still another object is to provide a bed liner that is releasably yet securely fastened to the bed it protects.

Yet another object of this invention is to provide a bed liner that may be converted to a camper top quickly and with minimal effort.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 5 is a perspective view of a fastening means having utility in connection with the first embodiment;

FIG. 9 includes a cross sectional view of a suggested fastening means having utility in connection with the second embodiment of the invention;

FIG. 11 is a detailed perspective view of a rear corner of the apparatus shown in FIG. 10;

FIG. 13 is a cross sectional view of various fastening means having utility in connection with the third embodiment of the invention.

Similar reference numerals refer to similar parts throughout the several views of the drawings.

DETAILED DESCRIPTION OF THE PREFERRED EMBODIMENT

Figure 1:
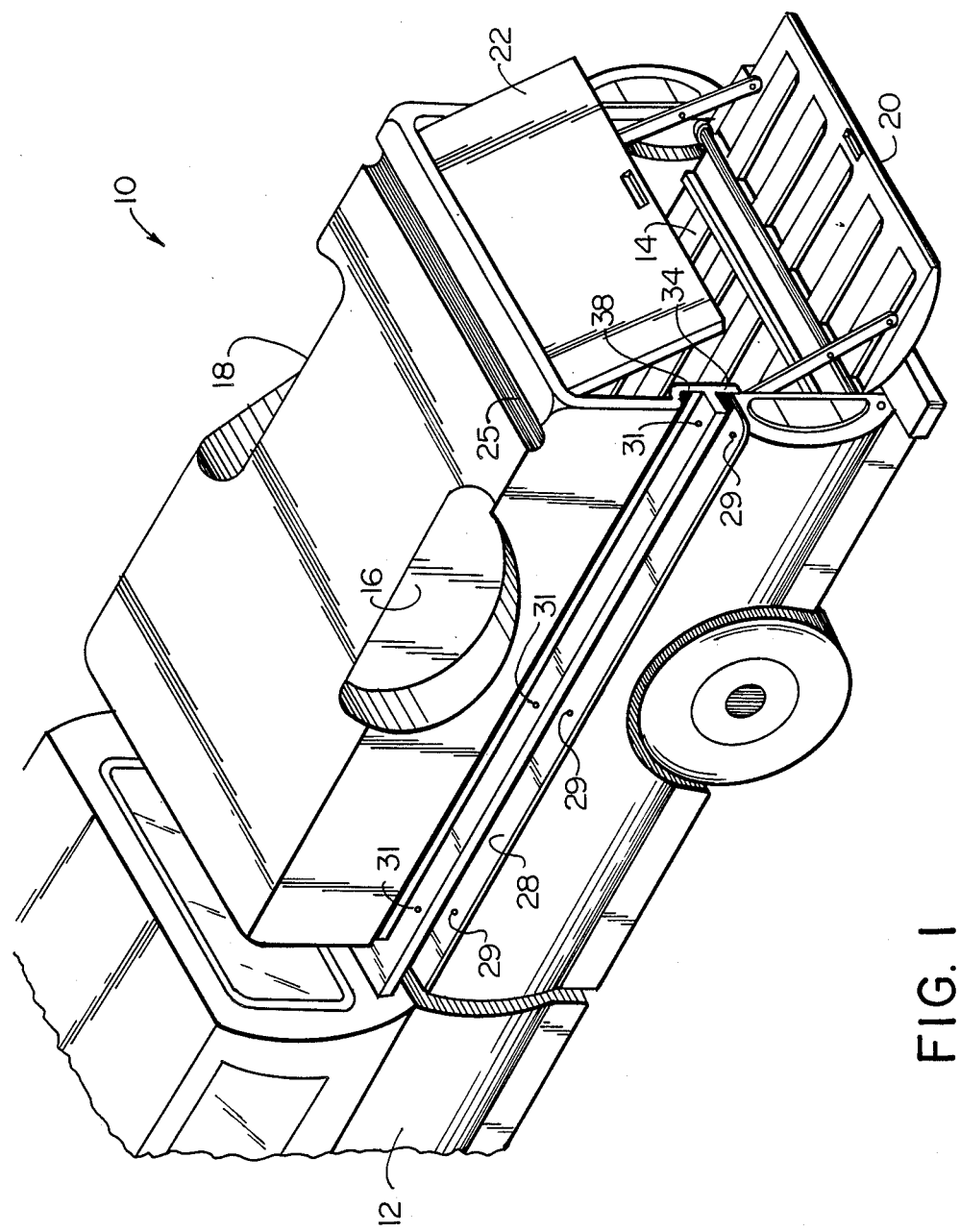
FIG. 1 is a perspective view of a pick-up truck, showing a first exemplary embodiment of the novel assembly in vertically spaced relation to the truck's bed.

Referring now to FIG. 1, it will there be seen that a first illustrative embodiment of the invention is denoted by the reference numeral 10 as a whole.

The pick-up truck in the drawing has a cab 12 and bed 14 that is unlined in FIG. 1 since the inventive apparatus is being used as a camper top in that illustration.

Figure 3:
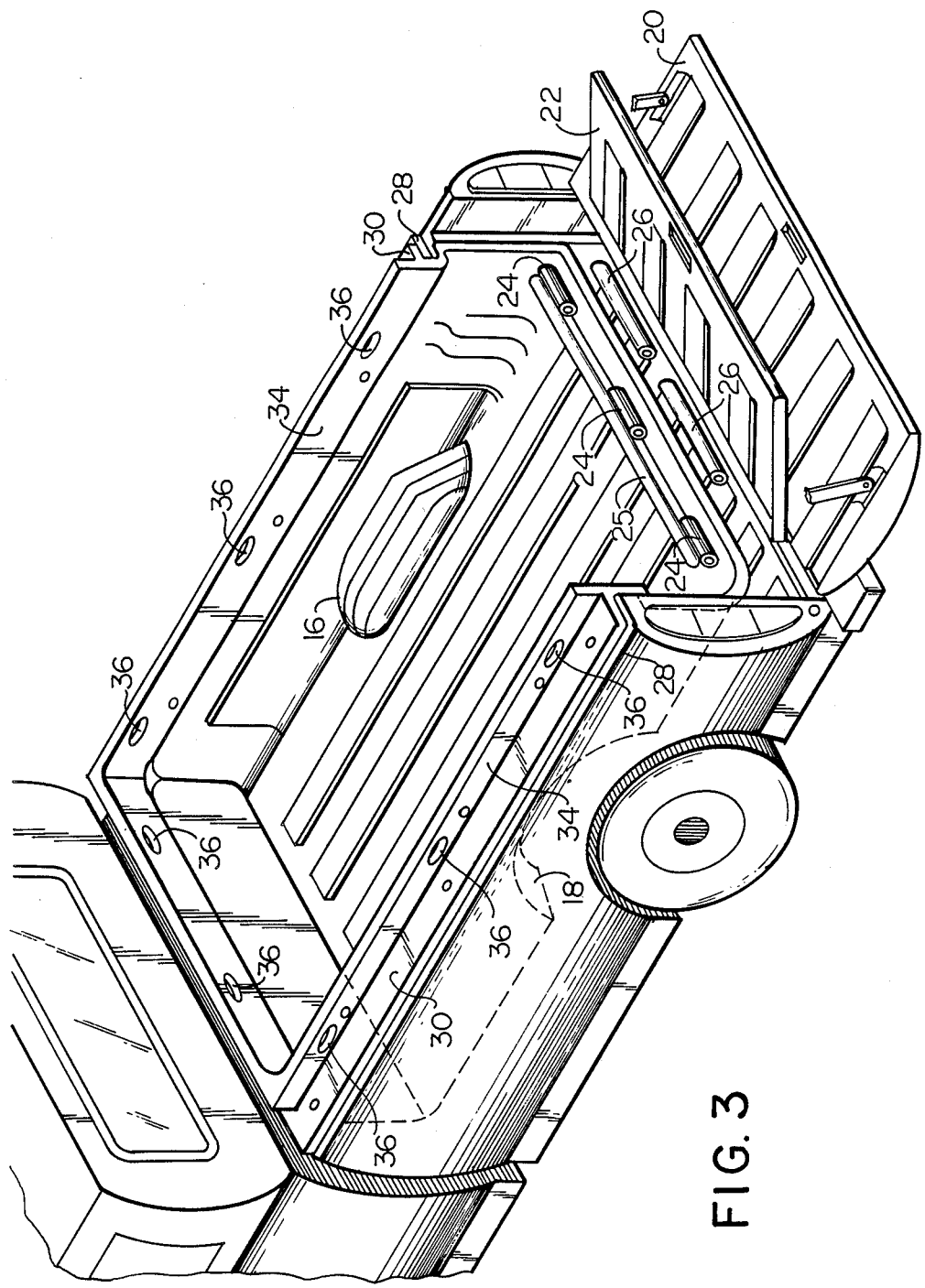
FIG. 3 is a perspective view showing the apparatus of FIG. 1 in use as a bed liner.

Recessed areas 16, 18 receive the truck's wheel wells when the novel apparatus is used as a bed liner as best understood in connection with FIG. 3.

In FIG. 1, it should be noted that the truck's tailgate 20 is hingedly mounted in conventional fashion to the rear of bed 14; closure member 22 of the novel apparatus cooperates with tailgate 20 to close the enclosed area of the truck when the apparatus is used as a camper top.

Figure 4:
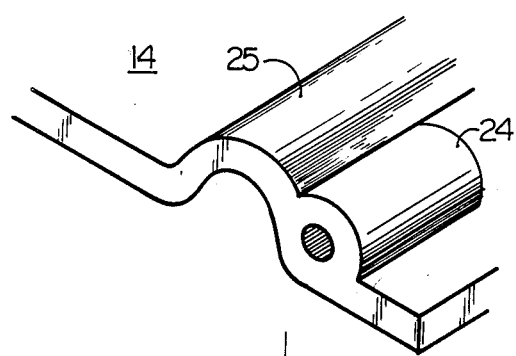
FIG. 4 is an enlarged, detailed view of a hinge means having utility in connection with all embodiments of the invention.

The hinged connection of closure member 22 is best shown in FIGS. 3 and 4; in FIG. 3 the closure member is shown in exploded configuration to better reveal the hinged construction. Specifically, three axially aligned tubular members, collectively denoted 24, are secured to the liner 14 adjacent its rearward edge as shown, and a pair of axially aligned tubular members, collectively denoted 26, are secured to the inner wall of closure member 22 as depicted. The tubular members 26 are brought into axial alignment with tubular members 24 and a hinge pin is passed through all of the tubular members to provide the hinge in the well known manner. A transverse upraised or convex portion 25 of bed 14 is integral with the the hinge means as shown in FIGS. 3 and 4; the concave opposite side of portion 25 is shown in FIG. 1.

Figure 2:
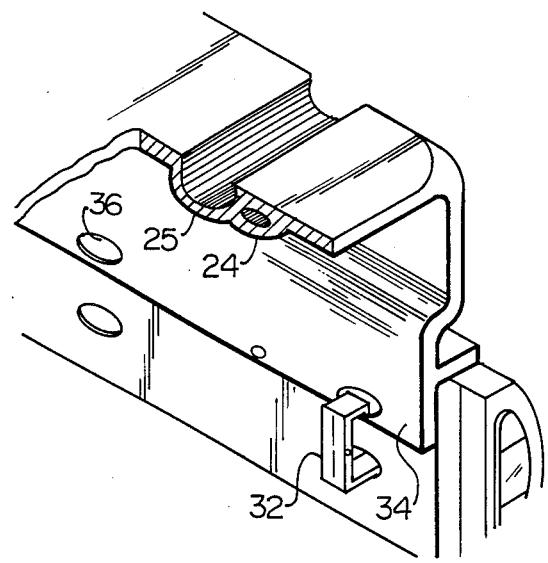
FIG. 2 is an enlarged, detailed view of a rear corner of the apparatus shown in FIG. 1.

Returning now to FIGS. 1 and 2, it will there be seen that the uppermost border of bed 14 on a typical truck will include a pair of longitudinally aligned, laterally spaced flats 28, only one of which is visible in FIG. 1.

In the first embodiment of this invention, a mating flat 30 is formed on each side of the novel liner/camper top as shown, and flats 28 and 30 are bored at matching intervals as at 29 and 31, respectively, so that the camper top can be secured to the bed with bolts if desired. Alternatively, clamps such as the clamp denoted 32 in FIG. 2 could be employed in lieu of bolts.

When the apparatus is being used as a bed liner as shown in FIG. 3, materials being transported may be covered by canvas or other sheet material or may be secure by ropes; in either situation, flange means 34, which has a "U"-shape when seen in plan view and which extends about the sides and front of the apparatus as best shown in FIG. 3, is provided with openings collectively denoted 36 to provide means for tieing such ropes or sheet materials.

It should also be noted that in this particular embodiment, the sidewalls of the liner/top are contoured as at 38 to match the contour of the particular truck model depicted as perhaps best understood in connection with FIG. 3.

An "H"-shaped fastening means 39" for fastening the novel apparatus to flats 28 is depicted in FIG. 5.

Figure 6:
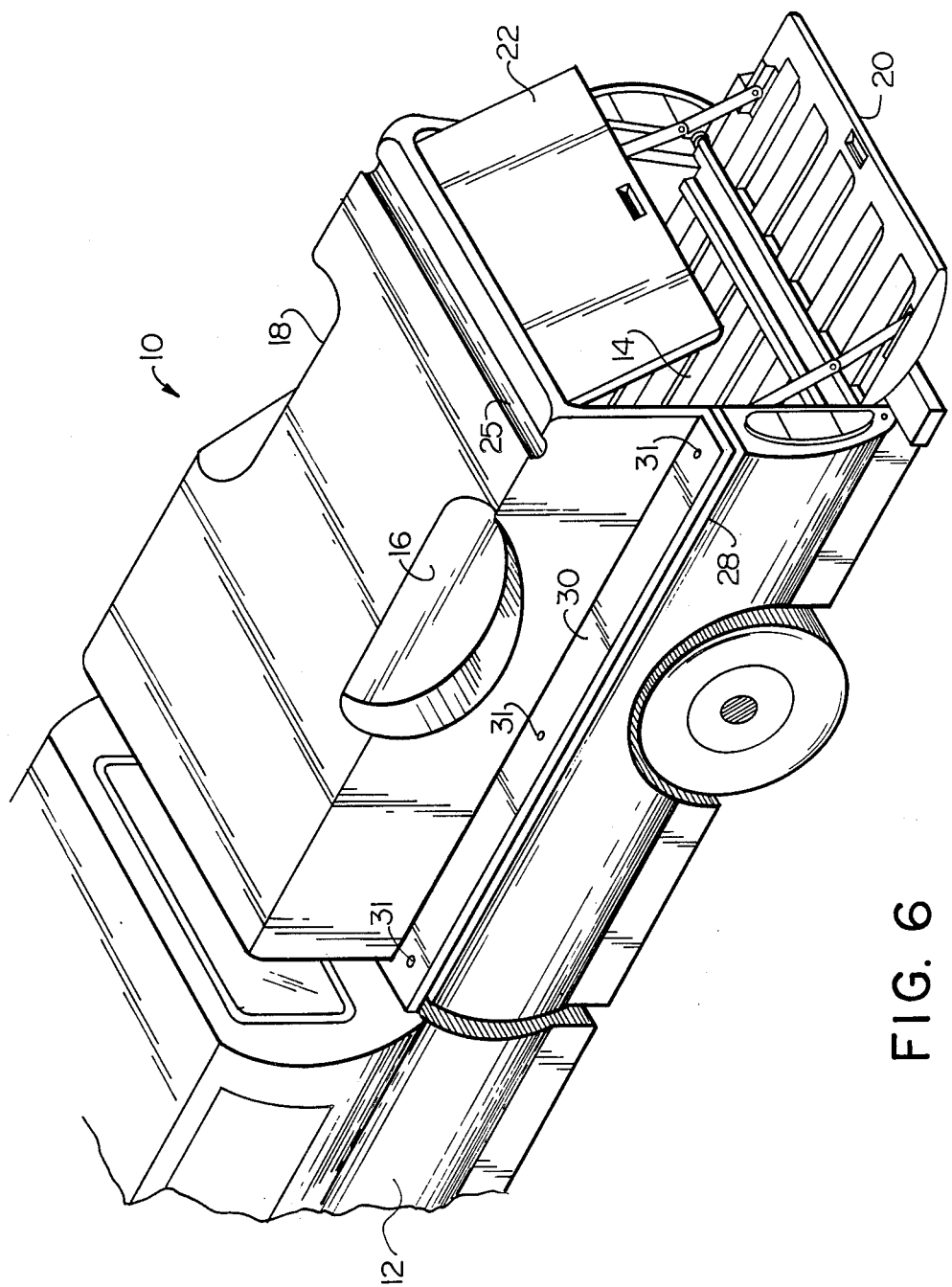
FIG. 6 is a perspective view of a second embodiment of the inventive apparatus, showing it being used as a camper top.
Figure 7:
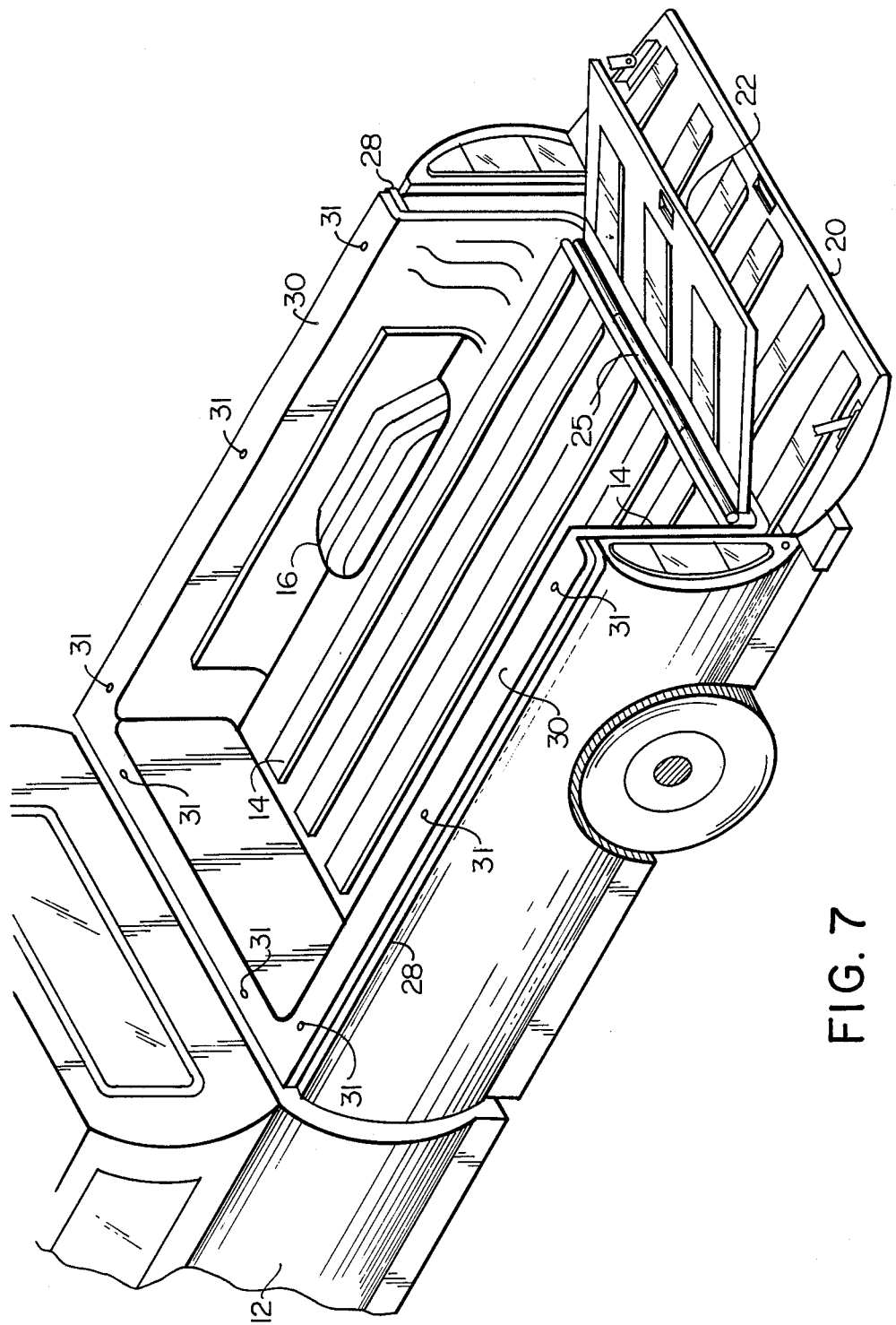
FIG. 7 depicts the embodiment of FIG. 6 in use as a bed liner.

FIGS. 6 and 7 illustrate a slightly different in appearance construction. In this particular embodiment, contour 38 and flange 34 are not provided but in all other respects the inventive structure remains the same as indicated, for example, by the abutting engagement of flats 28 and 30.

Figure 8:
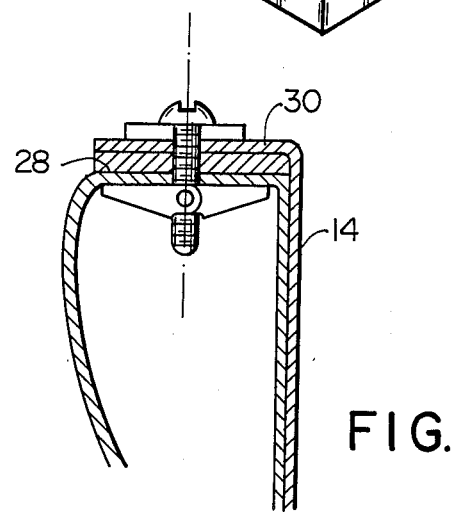
FIG. 8 is a cross sectional view showing a suggested mounting means for the second embodiment.

The screw and nut attachment means of FIGS. 8 and 9 may be employed to secure flats 28 and 30 to one another.

Figure 10:
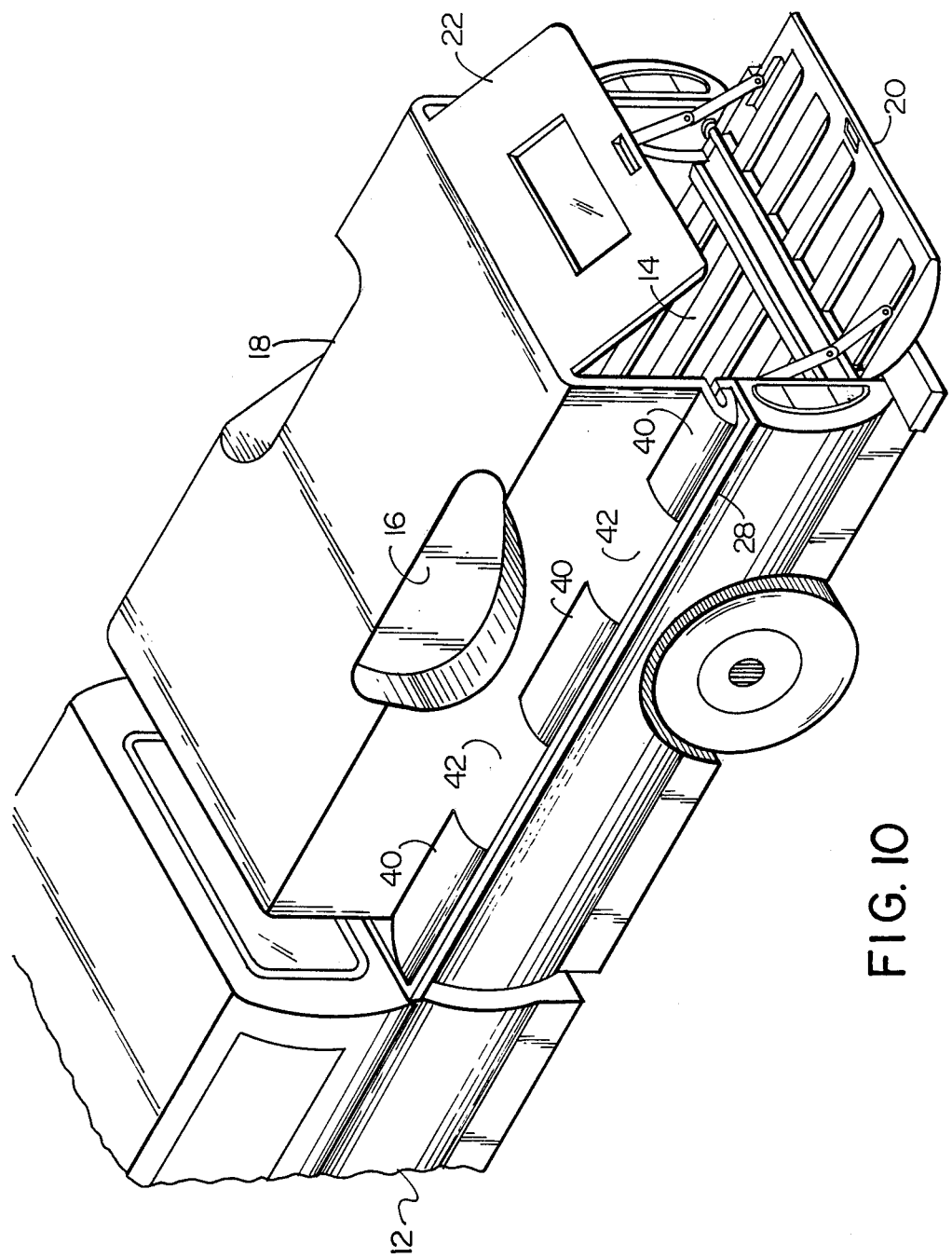
FIG. 10 is a perspective view of a third embodiment of the invention in use as a camper top.
Figure 12:
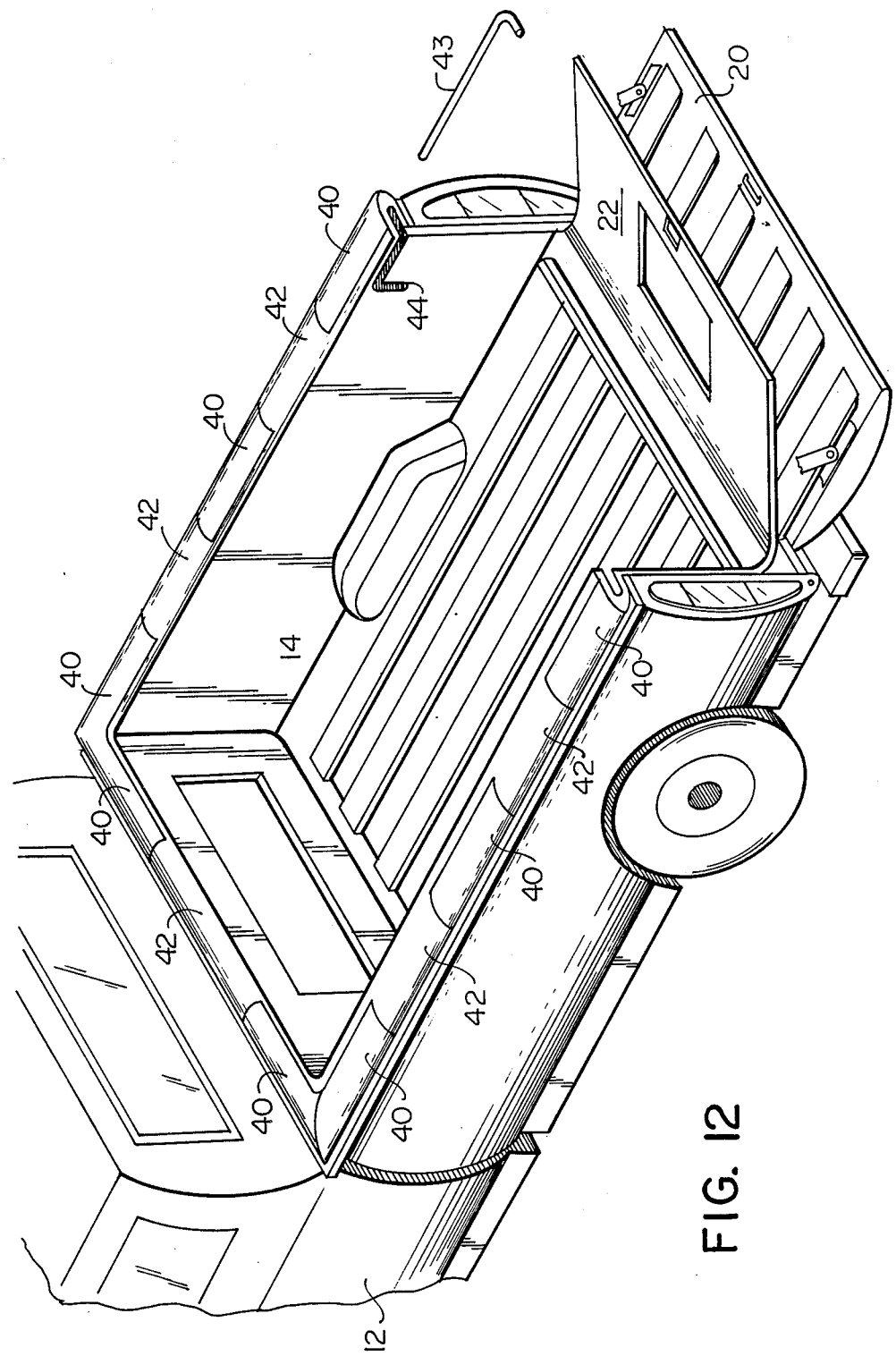
FIG. 12 shows the third illustrative embodiment of the invention in use as a bed liner.

Another variation of the invention is depicted in FIGS. 10 and 12, although the detailed view of FIG. 11 perhaps best depicts the means for interconnecting the novel apparatus to the truck bed. In this suggested embodiment, base members 40 are atop flats 28; protuberances 42 interlock therewith as shown and an elongate rod, 43, (FIG. 12), which extends through bore means 44, unites the structures. The end of rod 43 is bent and is flipped down to clamp closure member 22 in its closed configuration as suggested in FIG. 12. Alternate screw and nut fastening means are shown in FIG. 13.

The interlocking mechanisms of all three embodiments facilitate the quick converting of the bed liner into a camper top; those skilled in the art of machine design and in the mechanical arts generally will be aware of numerous other ways whereby the liner may be quickly converted into a camper top, now that the basic invention has been disclosed and three suggested quick release attachment means have been disclosed.

Since pick-up trucks are made in many different models and since the number of ways a combination bed liner and camper top can be secured to a truck bed is very high, it is not intended to limit this invention to the specific fastening means and attachment methods described herein, as they are merely illustrative and form no part of the invention, per se. The invention resides in the combination bed liner and camper top itself, which combination was heretofore unknown because it was not obvious to the makers of bed liners and camper tops that a single article of manufacture could be built to provide both functions.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:
1. An article of manufacture, comprising:
 a truck bed lining means that protectively overlies a truck bed and that conforms to the configuration and dimension of said truck bed;

said truck bed lining means being releasably secured in overlying relation to said truck bed;

said truck bed lining means forming a camper top means when released from its overlying relation to said truck bed, inverted and secured in enclosing relation to said truck bed; and a closure member hingedly connected to said truck bed lining means, said closure member cooperating with a tailgate means of a truck to enclosed a bed area of said truck when said truck bed lining means is in its inverted, camper top means-providing position.

2. The article of claim 1, wherein said truck bed lining means further comprises a horizontal flange means having a first surface that overlies an uppermost periphery of a truck bed when said truck bed lining means is deployed as a truck bed lining means and a second parallel surface that overlies said uppermost periphery of said truck bed when said truck bed lining means is deployed as a camper top means.

3. The article of claim 2, wherein said flange means has a "U"-shaped configuration and its open end is coincident with a tailgate area of said truck.

4. A combination truck bed lining means and camper top means for use with pick-up trucks, comprising:

an integrally formed truck bed lining means;

said truck bed lining means conforming to the contour of a truck bed;

said truck bed lining means disposed in overlying relation to the truck bed of a pick-up truck;

said truck bed defined by a bottom wall and a pair of transversely spaced apart, longitudinally extending, upstanding sidewall members and a transversely disposed, upstanding forward wall member;

said truck bed lining means defined by a bottom wall and a pair of transversely spaced apart, longitudinally extending, upstanding sidewall members and a transversely disposed, upstanding forward wall member;

said upstanding walls of said truck bed and truck bed lining means being releasably secured to one another, at respective free ends thereof, when said truck bed linings means is positioned in overlying relation to said truck bed;

said upstanding walls of said truck bed and truck bed lining means being releasably secured to one another, at said respective free ends, when said truck bed lining means is inverted and deployed as a camper top means; and a hingedly mounted closure member that is positioned forwardly of a tailgate member of said pickup truck when said truck bed lining means is positioned in overlying relation to said truck bed and which closure member cooperates with said tailgate member to enclose a bed area of said truck when said truck bed lining means is inverted and deployed as a camper top means.

5. A camper top member for enclosing a bed area of a pick-up truck, comprising:

a generally horizontal top wall member;

a pair of sidewall members depending from said top wall member in parallel relation to one another;

a forward wall member depending to a forward end of said top wall member;

wheel well-receiving recess means formed in said top wall member and said side wall members;

a truck bed;

said truck bed defined by a pair of sidewall members and forward wall member that project upwardly from a bottom wall member of said truck bed, said upwardly projecting wall members supporting said depending sidewall and top wall members;

means releasably securing a lowermost periphery of said depending walls to an uppermost periphery of said upwardly projecting walls;

said top wall member and depending wall members being invertable and being specifically configured and dimensioned to overlie said truck bed in protective relation thereto when inverted; and a hingedly mounted closure member that depends to said top wall member at a rearward end thereof.

6. The camper top of claim 5, wherein said closure member cooperates with a tailgate member of said truck to enclose a bed area of said truck when said camper top is being used as a camper top means.

7. The camper top of claim 6, wherein said wheel well-receiving recess means overlie wheel wells formed in said truck bed when said camper top is inverted and used as a truck bed lining means.

* * * * *